United States Patent [19]

Birkenbach

[11] 3,831,685
[45] Aug. 27, 1974

[54] DISK GANG COUPLING FOR HARROWS AND THE LIKE

[75] Inventor: Eugen J. Birkenbach, Park Ridge, Ill.

[73] Assignee: International Harvester Company, Chicago, Ill.

[22] Filed: Mar. 2, 1973

[21] Appl. No.: 337,321

[52] U.S. Cl. .............................. 172/568, 172/583
[51] Int. Cl. ..................... A01b 5/06, A01b 15/16
[58] Field of Search .......... 172/311, 520, 568, 583, 172/599, 600; 192/67 R, 67 P

[56] References Cited
UNITED STATES PATENTS

| | | | |
|---|---|---|---|
| 3,102,598 | 9/1963 | Mighell | 172/568 |
| 3,529,675 | 9/1970 | Wheeler | 172/568 |
| 3,702,639 | 11/1972 | Womble et al. | 172/568 |

Primary Examiner—Robert E. Pulfrey
Assistant Examiner—Paul T. Sewell
Attorney, Agent, or Firm—F. David AuBuchon; Floyd B. Harman

[57] ABSTRACT

A gang coupling for correlating the rotary movements of the arbor bolts of adjacent aligned disk gang sections of a disk harrow or the like. Cooperating driving and driven coupling members are mounted on the adjacent ends of the coaxial arbor bolts and embody torque transmitting fingers which overlap each other in a longitudinal direction and assume the same degree of eccentricity relative to the common axis of the arbor bolts so that they are disposed in the same cylindrical surface of revolution and thus are capable of side-by-side engagement with each other for torque-transmitting purposes but allow for circumferential lost motion in either direction through an arc of slightly less than 360°.

8 Claims, 11 Drawing Figures

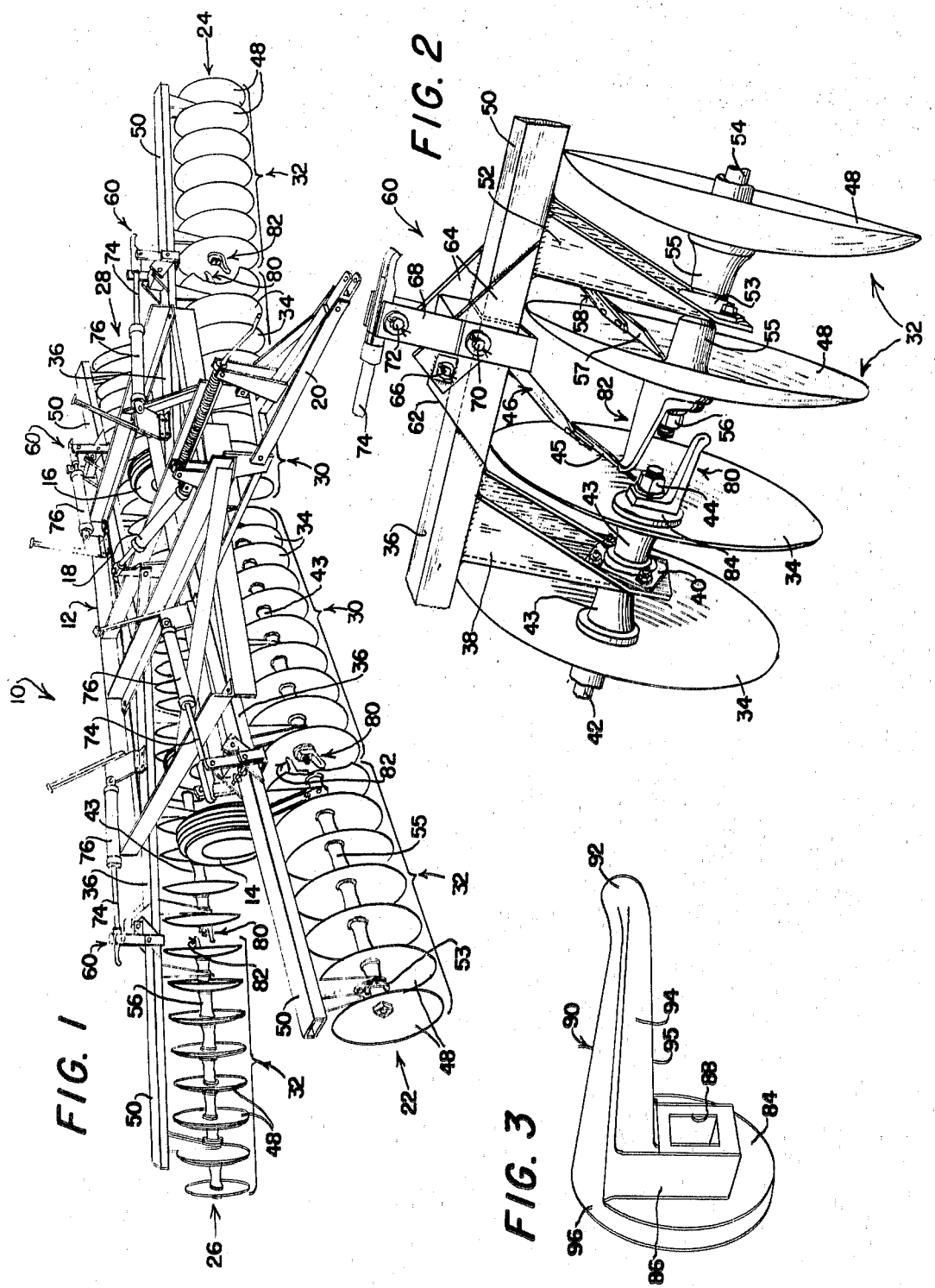

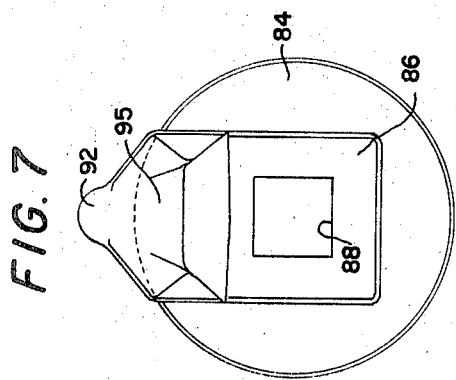
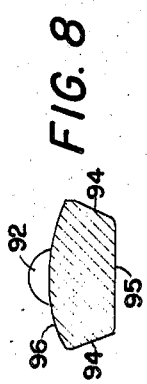
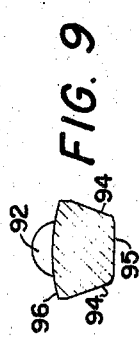
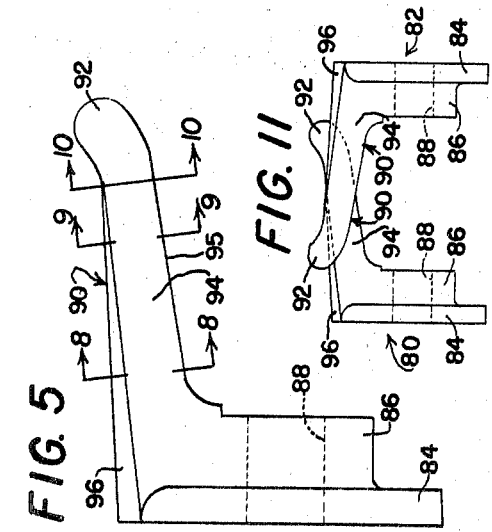
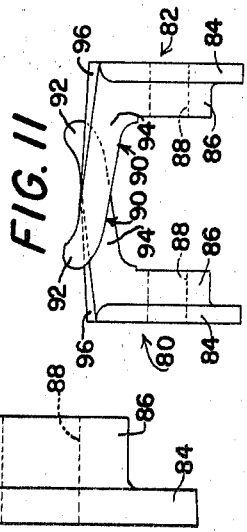
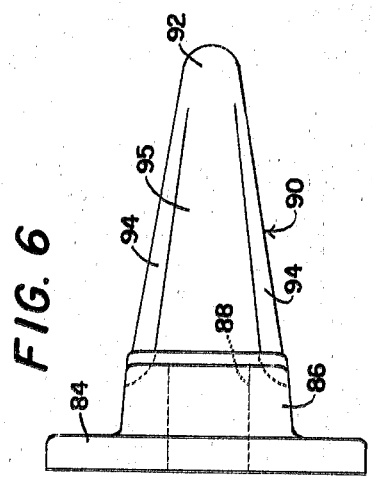
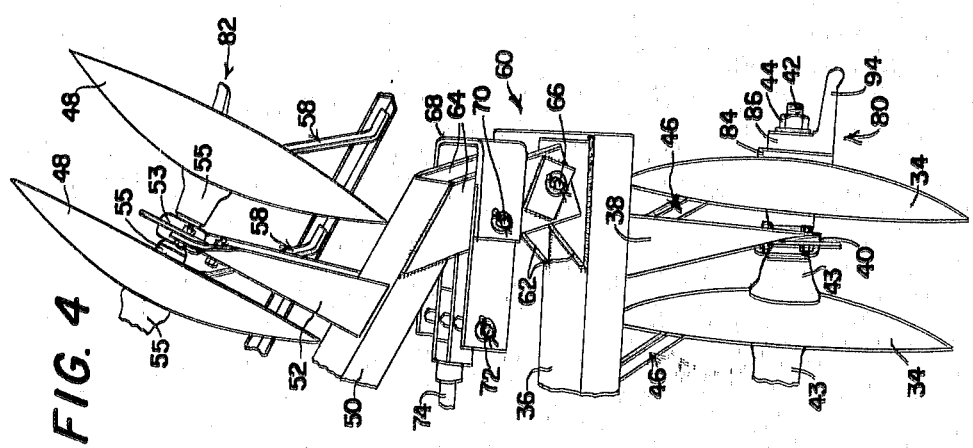

DISK GANG COUPLING FOR HARROWS AND THE LIKE

The improved disk gang coupling comprising the present invention has been designed for use primarily in connection with collapsible disk harrow implements having outer disk gang sections which fold upwardly and inwardly in reentrant fashion over adjacent main gang sections. The invention is, however, capable of other uses and the same may, if desired, with or without modification as required, be employed in connection with harrow or tilling implements having non-folding or permenently coaxial split disk gangs, the only requisite being that the gang assemblies consist of two gang units or sections having separate arbor bolts. Irrespective however, of the particular use to which the invention may be put, the essential features thereof remain substantially the same.

It has heretofore been the practice in connection with wide disk harrow implements to provide the inner main disk gang sections with foldable outer extension gang sections, which are commonly referred to as wing gangs, in order to extend the overall width of the implement when it is in operation and to reduce the width thereof for transport purposes. It has been found that in connection with this type of implement where there is independent rotating action of the main gangs and their associated wing gangs clogging of the disks which are associated with either a main gang section or a wing gang section will have a deleterious effect on the other gang section since the clogged gang section will function as a solid cylindrical roller and cause undesirable elevation of the other coaxial gang section. It has also been found that where there is a means for imparting rotative action in unison to the disks of both the main gang section and the associated wing gang section, the tractionally induced torque which is applied to the disks of the main gang section, when transmitted to the disks of the wing gang section, will frequently inhibit the tendency of the latter gang section to become clogged by exerting a wiping action by the ground on such disks, as well as forcing them to rotate relative to their scraper blades. This is especially true where there is a traction differential between the disks of the two gang sections. Ordinarily, where main gang and associated coaxial extension or wing gang sections are concerned, the tractional drag on the disks of the main gang section is greater than it is upon the wing gang section due to placement, weight distribution and other factors so that there usually is a tendency for the disks of such a main gang to till deeper and thus rotatively overrun the disks of the associated wing gang. Thus, where a torque-transmitting coupling is provided between the disks of the two gang sections, the disks of the main gang section usually function as driving disks whereas the disks of the wing gang section function as driven disks although changes in soil conditions may cause a temporary reversal of such functions. In either event, it is desirable to provide a torque-transmitting coupling between the disks of both coaxial sections and this is usually accomplished by providing a releasable coupling between the arbor bolts which are associated with the gang sections, such coupling becoming automatically released when the wing gang section is swung to its folded reentrant position above the main gang section.

Heretofore, in an effort to transmit torque from the disks of the main gang section to the disks of the associated coaxial wing gang section, it has been the practice to provide the arbor bolt of one gang section with a male coupling member and to provide the arbor bolt of the other gang section with a cooperating female coupling member, the two coupling members automatically moving into coupled or mating relationship at such time as the wing gang section is swung from its raised folded position to its lowered coaxial position relative to the main gang section. Such coupling devices have not proven altogether satisfactory for numerous reasons, one such reason residing in the fact that the support bar of the wing gang section is pivoted to the support bar of the main gang section by an offset hinge assembly so that it swings on an arc into and out of its operative position. Thus, with close hinge tolerances proper alignment of the male and female coupling members is not easily attained. By the same token, before the support bar of the wing gang section can be moved into coaxial relation relative to the support bar of the main gang section, the square hexagonal or other out-of-round male and female coupling surfaces must be rotationally aligned to insure mating engagement. Additionally, this type of coupling requires that the arbor bolts of the main and wing gang sections assume precise axial alignment with only very small tolerance allowances. The maintenance of such close tolerances greatly detracts from the linear flexibility of the multiple gang assembly as a whole, thereby establishing a degree of rigidity in such assembly which may result in unequal soil tilling among the various disks, especially when encountering uneven terrain or unequal earth density. Examples of this type of prior art devices are shown in the U.S. Pat. No. 3,102,598 of Sept. 3, 1963 to Mighell, and No. 3,529,675 of Sept. 22, 1970 Wheeler.

A further limitation that is attendant upon the construction and use of conventional disk gang couplings arises from the fact that after mating engagement of the coupling parts has been effected, the two adjacent gang sections are clutched together, so to speak, so that all of the disks associated therewith are obliged to rotate in unison and at a rate which is precisely equal to the mean degree of torque which is collectively applied to the thus coupled gang of disks. Such constant and uninterrupted equal rotation of the disks of the two gang sections is not always desirable since, at certain times in the tilling of a given area of soil, it is advantageous to allow independent rotation of the disks of the two gangs, even if only for a brief interval of time.

Yet another limitation which is associated with mating coupling parts of this general character resides in the fact that the female coupling part frequently becomes clogged so that it will not admit the male part and, when this situation exists, it may be difficult to loosen and remove the foreign clogging material.

The present invention is designed to overcome the above-noted limitations which are present in connection with conventional disk gang couplings and, toward this end, the invention contemplates the provision of a novel two-part coupling for split disk gang assemblies and by means of which effective engagement of the parts may readily be made without interference regardless of the relative circumferential position of the parts. The invention further makes provision for a nearly 360° component of lost motion between the parts so that when the earth-induced torque which is imparted to the disks of the two gang sections is approximately equal, intergang driving torque is discontinued and the two groups of disks rotate independently of each other until such time as a torque differential is again established. Moreover, the invention further contemplates the provision of a gang coupling which is entirely devoid of contoured apertures or sockets within which dirt or other foreign substances may collect, or of interfitting parts which establish recesses that are subject to clogging, the coupling parts of the present invention being in the form of finger-like projections which are exposed on all sides and which therefore will shed dirt rather than collect it. By such an arrangement little or no attention to cleaning operations is required.

The provision of a gang coupling such as has briefly been outlined above, and possessing the stated advantages, constitutes the principal object of the present invention.

The provision of a disk gang coupling which, in the main is comprised of but two identical parts, each of which is in the form of a casting and which therefore may be manufactured at a low cost; one which may be used as original equipment or applied to existing harrow and similar implements; one which is capable of ease of application to the arbor bolts of adjacent disk gang sections without the use of special tools and without requiring for its installation the use of extraneous clamping or fastening devices other than the existing arbor nuts which are associated with such bolts; one which is rugged and durable and which, therefore, will withstand rough usage; one which consumes but little space in the area of its installation so that it does not interfere with adjacent implement parts and therefore allows a wide selection of offset hinge connections to be used for effecting pivotal connection of the wing gang to the main gang; and one which, otherwise, is well adapted to perform the services required of it are further desirable features which have been borne in mind in the production and development of the present invention.

Numerous other objects and advantages of the invention, not at this time enumerated, will become readily apparent as the nature of the invention is better understood.

In the accompanying two sheets of drawings forming a part of this specification, one illustrative embodiment of the invention has been shown.

In these drawings:

FIG. 1 is a front perspective view, somewhat schematic in its representation, of a tandem, wing-type disk harrow embodying the present invention and showing the same in its operative extended or working position;

FIG. 2 is an enlarged fragmentary front perspective view of a limited portion of the front right pair of disk gang assemblies as viewed in FIG. 1, the view being taken in the vicinity of the juncture region between the inner main disk gang section and the outer wing disk gang section and illustrating the releasable driving connection or coupling between the two gang sections in their operative condition;

FIG. 3 is a further enlarged perspective view of one of two substantially identical coupling members which are employed in connection with the releasable driving connection of FIG. 2;

FIG. 4 is an enlarged perspective view of a limited portion of the rear right disk gang assembly and showing adjacent gang sections in their folded inoperative condition and with the coupling disengaged;

FIG. 5 is a side elevational view of the coupling member of FIG. 3;

FIG. 6 is a bottom plan view of the structure shown in FIG. 5;

FIG. 7 is an end view of the structure shown in FIGS. 5 and 6;

FIG. 8 is a sectional view taken on the line 8—8 of FIG. 5;

FIG. 9 is a sectional view taken on the line 9—9 of FIG. 5;

FIG. 10 is a sectional view taken on the line 10—10 of FIG. 5; and

FIG. 11 is a fragmentary side elevational view illustrating schematically the manner in which torque is applied between the coupling members.

Referring now to the drawings in detail and in particular to FIG. 1, a wide angle, tandem type, disk harrow implement on which the wing gang coupling of of the present invention is installed is designated in its entirety by the reference numeral 10. Briefly, the implement involves in its general organization a wide rectangular main frame 12 which is tractionally supported on swingable wheel units 14 and 16 having means including a hydraulic cylinder 18 whereby the wheel units may be raised and lowered relative to the frame 12 for selectively moving the frame and its associated tools into and out of ground engagement as is customary in connection with disk harrow implements of the character under consideration. A towing tongue 20 is provided at the forward end of the frame 12 for connection to a tractor or other motivating vehicle.

The frame 12 carries four pairs of disk gangs including right and left (as viewed in FIG. 1) pairs of front disk gang assemblies 22 and 24, respectively, and right and left pairs of rear disk gang assemblies 26 and 28 respectively. Each pair of disk gang assemblies is comprised of an inner fixed main gang section 30 and an outer movable wing gang section 32 which normally is aligned axially with the fixed gang section but which is capable of being folded upwardly and inwardly over the latter gang section in the manner shown in FIG. 4 in order to reduce the overall width of the implement when the latter is in transport. The front disk gang sections 22, 24 angle inwardly and rearwardly whereby the earth resistance causes inward axial thrust on these sections. The rear disk gang sections 26, 28 angle rearwardly and outwardly and are thus subjected to outward axial thrust when the implement is in use.

Insofar as the disk mounting characteristics of the four front and rear main disk gang section 30 are concerned, these sections are substantially identical and therefore a description of one of them will suffice for them all. Each main gang section 30 is comprised of a series of disks 34 which are supported beneath an overlying support bar 36 from which there depend a series of bearing-supporting arms 38 (see also FIG. 2) which carry bearing assemblies 40 at their lower ends. The bearing assemblies 40 serve to rotatably support a common arbor shaft or bolt 42 having square sections (not shown) which receive thereover the disks 34 in the usual manner of disk mounting, while spacer spools 43 serve to position the disks in their spaced relationship. Arbor nuts 44 at the opposite ends of the bolt 42 serve to clamp the various disk-supporting parts together. Conventional scraper blades 45 (FIG. 2) which are carried on a blade-supporting frame 46 cooperate with the various disks 34 in the usual manner of operation.

The four wing gang sections 32 are similar to the main gang sections, it being sufficient for descriptive purposes to state that each such wing gang section 32 embodies a series of disks 48 (FIGS. 1, 2 and 4), a support bar 50, depending bearing-supporting arms 52, bearing assemblies 53, an arbor shaft or bolt 54, spacer spools 55, arbor nuts 56, scraper blades 57, and a blade-supporting frame 58, these elements or instrumentalities being substantially identical to the corresponding elements or instrumentalities heretofore described in connection with the main gang sections 30. It will be appreciated that when the two support bars 36 and 50 are in alignment, they constitute, in effect, a composite support bar for the wing gang assembly 22 as a whole.

As previously stated, the wind gang sections 32 are capable of being folded upwardly and inwardly over their associated main gang sections 30 and, accordingly, they are pivotally connected to such main gang sections by offset hinge assemblies 60. The particular hinge assembly illustrated herein constitutes no part of the present invention and other offset type hinge assemblies may be employed for pivotally connecting the wing gang sections 32 to their associated main gang sections 30, as for example the offset hinge assembly which is shown and described in U.S. Pat. No. 3,693,724, granted on Sept. 26, 1972 and entitled MECHANISM FOR FOLDING AND LOCKING DISK HARROW GANGS. Irrespective, however, of the particular offset hinge assembly which may be employed for pivotally connecting the wing gang sections to the main gang sections, the essential features of the present invention remain substantially the same.

As best shown in FIGS. 2 and 4, the particular hinge assembly 60 selected for exemplary purposes herein includes a pair of trapezoidal plates 62 which are welded along their lower edges to the upper corner edges of the fixed support bar 36 and a second pair of trapezoidal plates 64 which are welded to the opposite side faces of the movable support bar 50. The two pairs of plates 62 and 64 overlap each other in adjacent corner regions and a hinge pin 66 pivotally connects the pairs of plates together. These two pairs of plates 62 and 64 thus, in effect, constitute an offset hinge proper by means of which the movable support bar 50 may be swung relative to the fixed support bar 36 between the axial in-line position in which it is shown in FIG. 2 and the reentrant elevated position in which it is shown in FIG. 4.

A compound two-piece U-shaped saddle member 68 straddles the pair of plates 64 and is hingedly connected thereto by a second hinge pin 70. A third hinge pin 72 extends across the distal ends of the saddle member 68 and is pivotally connected to the outer end of a plunger 74 which is associated with an hydraulic actuating cylinder 76 (FIG. 1) by means of which the movable support bar 50 may be moved between its two extreme positions. The inner end of the cylinder 76 is pivotally connected to an appropriate point on the framework of the implement. The outer end of the plunger projects a slight distance beyond the pivot pin 72 as best shown in FIG. 2 and this projecting portion of the plunger is adapted to seat upon the hinge pin 70 when the wing gang section 30 is in its raised reentrant position. It will be understood, of course, that means are provided for selectively supplying hydraulic motive fluid to the opposite ends of the cylinder 76 for extending and retracting the wing section 32.

The arrangement of parts thus far described is purely conventional and no claim is made herein to any novelty associated with the same since trandem disk harrow implements having hydraulically operable foldable wing gang sections similar to the sections 32 are well-known, the novelty of the present invention residing rather in the manner in which a driving connection is effected between the disks of the main gang sections 30 and the disks of their associated wing gang sections 32 and which will be described hereinafter and subsequently claimed.

Referring now to FIGS. 2, 5, 6 and 7, according to the present invention, and in order to establish a driving connection which will transmit power from the disk assembly of the main gang section 30 of each front disk gang assembly 22 and 24 to the disk assembly of the associated wing gang section 32, a pair of cooperating finger-like driving and driven coupling members 80 and 82 are affixed to the concave side of the outermost disk 34 of the main gang section 30 and to the opposed convex side of the innermost disk 48 of the adjacent wing gang section 32 as clearly shown in FIG. 2. These two members 80 and 82 extend in opposite longitudinal directions relative to the axis of the disk gangs and they are each eccentrically mounted on their respective disks with the same degree of eccentricity. These members 80 and 82 overlap each other, which is to say that they revolve about the longitudinal axis of the disks 34 and 48 in the same cylindrical surface of revolution and thus are capable of side-to-side engagement with each other as shown in FIG. 11 for the direct transmission of power from the driving member 80 to the driven member 82 although in actual operation of the implement 10 they are not always in driving relationship since there is a nearly 360° arc of lost motion between the members. Ordinarily, and in accordance with phenomena that has previously been described herein, the member 80 will function as a driving member but, on occassions and due to varying soil conditions, the member 82 may function as the driving member while the member 80 functions as the driven member. Under some soil conditions, the two members 80 and 82 may rotate independently of each other in a free floating condition, so to speak, but over any given period of time neither group of disks 34 and 48 may deviate in its rotation from the other group by more than one complete revolution. Despite the fact that occasionally the member 82 may function as the driving member, in the interests of clarity this member is referred to herein as the driven member while the member 80 is referred to as the driving member, these functions being the predominate functions of the two members.

As previously stated, the two members 80 and 82 are substantially identical and, accordingly, a description of the member 80 will suffice for the member 82. As clearly shown in FIGS. 2 and 3, the member 80 may be in the form of a metal casting, and it embodies a circular base 84 on which there is formed a rectangular hub portion 86 having a square bore 88 extending therethrough which is adapted to be received over one of the aforementioned square sections of the associated arbor shaft 42.

Considering the member 80 in the position in which it is shown in FIGS. 3 and 5, a driving finger proper 90 projects forwardly from the upper region of the hub portion 86 an appreciable distance and is inclined upwardly from the axis of the bore 88 at a small angle on the order of approximately 10°.

For maximum driving efficiency, the finger 90 is of tapered design and its distal end terminates in a generally rounded upwardly tilted bulbous portion 92 (FIGS. 2, and 7 to 10 inclusive) while the opposite side faces 94 thereof are generally planar and slope inwardly and downwardly. The underneath side 95 of the finger 90 is also generally planar while the upper surface or crown portion 96 of the finger is arcuate on a fairly large radius of curvature.

The member 80 is installed upon the outermost disk 34 with the circular base portion centered within the concavity of the disk by telescoping the member over the adjacent end of the arbor shaft 42 and then applying the arbor nut 46 to the shaft.

The driven member 82 is similarly applied to the inside end of the arbor shaft 56 of the wing gang section 32 but instead of being applied to the concave side of the innermost disk 48, it is applied to the convex side of such disk as shown in FIG. 2 where the driven finger will overlap the driving finger of the driving member 80 as previously set forth.

The foregoing description is predicated upon the application of the driving and driven members 80 and 82 to the arbor shafts 42, 56 and disks 34, 48 which are associated with the pair of front disk gang assemblies 22 and 24, the disclosure of FIG. 2 being applicable specifically to the installation of such members 80 and 82 to the disk gang assembly 24. When such members are installed on the rear disk gang assemblies 26 and 28, the disks of which have their convex sides facing outwardly of the implement, the driving members 80 will be applied to the convex sides of the outermost disk 34 of each main gang section 30 while the driven members 82 will be applied to the opposed concave sides of the innermost disks 48 of the associated wing gang sections 32 as shown in FIGS. 1 and 4.

It will be noted that in the operation of the driving connection of the present invention, and as shown in FIG. 11, when the driving member 80 engages the driven member 82 so as to make side-by-side contact therewith as shown in FIG. 11, rotary motion will be transmitted from the arbor bolt 42 of the main gang section 30 (FIG. 2) to the arbor bolt 54 of the wing gang section 32 and thus, while the two members 80 and 82 remain in such contact, the two sets of disks 34 and 48 will rotate in unison. Because of the inwardly sloping side faces 94 on the fingers 90, coextensive face-to-face engagement of the faces of the continuous fingers will take place so that there are no crevices into which dirt may collect and become caked.

It is to be noted that because of the fact that the opposite side faces 94 of the abutting fingers 90 slope inwardly toward each other as shown in FIG. 8, these faces meet squarely on a radial plane with respect to the longitudinal axis of the arbor bolts 42 and 54 so that driving torque is transmitted from the driving member 80 to the driven member 82 over a fairly large parallelogram area where the abutting faces of the members cross each other, so to speak, at a small angle on the order of 10°.

Finally, it is to be noted that because the fingers 90 of the two coupling members 80 and 82 are provided at their outer ends with bulbous portions 92, if a condition exists at the time of moving of the wing gang section 32 from its upper reentrant position to its lower in-line position with respect to the associated main gang section 30, the two coupling fingers 80 and 82 initially meet each other in substantially coaxial end-to-end engagement, these fingers will make camming engagement with each other and fall into place, so to speak, so that there will be no axial binding of one member upon the other.

The invention is not to be limited to the exact arrangement of parts shown in the accompanying drawings or described in this specification as various changes in the details of construction may be resorted to without departing from the spirit of the invention. For example, whereas the driving connection of the present invention has been shown and described in connection with holding disk gang assemblies, the principles of the invention are equally applicable to non-folding split disk gangs when the gang sections consist of two units with separate gang or arbor bolts. Therefore, only insofar as the invention has particularly been pointed out in the accompanying claims is the same to be limited.

What is claimed is:

1. In an agricultural implement, in combination, a disk gang assembly comprising a horizontal support bar, a pair of disk gang sections carried by said support bar, each section including an arbor bolt rotatably mounted on the support bar, and a plurality of axially spaced ground-working disks fixedly mounted on said arbor bolt for rotation in unison therewith, the arbor bolts of the two sections being coaxial and disposed in close end-to-end proximity and being normally independently rotatable, and coupling means constraining said arbor bolts, and consequently the disks carried thereby to rotate in unison while allowing for a large degree of circumferential lost motion therebetween throughout a major circle section of relative motion, said coupling means comprises a pair of coupling members fixedly secured to the adjacent ends of said arbor bolts and including longitudinally projecting eccentrically disposed torque-transmitting fingers which extend in opposite directions, overlap each other and possess the same degree of eccentricity whereby relative rotation between the arbor bolts in either direction will effect relative circumferential movement of the fingers in the same cylindrical surface of revolution into and out of torque-transmitting side-by-side engagement with each other.

2. In an agricultural implement, the combination set forth in claim 1, wherein the side faces of said fingers are planar and lie in respective radial planes relative to the axis of the arbor bolts whereby coextensive face-to-face engagement between abutting faces will take place when the fingers are in their side-by-side engagement.

3. In an agricultural implement, the combination set forth in claim 2, wherein said fingers slope radially outwardly away from the axis of the arbor bolts at a relatively small angle on the order of 10°.

4. In an agricultural implement, in combination, a foldable disk gang assembly comprising an inner main gang section having a fixed support bar, and an outer wing gang section having a movable support bar, each gang section including an arbor bolt rotatably carried by its respective support bar and a plurality of axially spaced ground-working disks fixedly mounted on the arbor bolt for rotation in unison therewith, hinge means pivotally connecting the inner end of the movable support bar to the outer end of the fixed support bar for swinging movement in an arc between an operative extended position wherein the arbor bolts are in axial alignment and an inoperative retracted position wherein the movable support bar overlies the fixed support bar in reentrant fashion, and coupling means effective when said movable support bar is in its extended position constraining said arbor bolts, and consequently the disks carried thereby, to rotate in unison while allowing for an appreciable degree of circumferential lost motion therebetween throughout a major circle sector of relative motion, said coupling means embodying a pair of coupling members fixedly secured to the adjacent ends of said arbor bolts and including longitudinally projecting eccentrically disposed torque-transmitting fingers which extend in opposite directions overlap each other and possess the same degree of eccentricity whereby relative rotation between the arbor bolts in either direction will effect relative circumferential movement of the fingers in the same cylindrical surface of revolution into and out of torque-transmitting side-by-side engagement with each other.

5. In an agricultural implement, the combination set forth in claim 4, wherein the side faces of said fingers are planar and lie in respective radial planes relative to the axis of the arbor bolts whereby coextensive face-to-face engagement between abutting faces will take place when the fingers are in their side-by-side engagement.

6. In a agricultural implement, the combination set forth in claim 5, wherein the distal ends of said torque-transmitting fingers are generally rounded so as to present convex surfaces which are designed for camming engagement with each other at such times as the fingers approach each other endwise during movement of the movable support bar toward its extended position.

7. In an agricultural implement, the combination set forth in claim 6, wherein said fingers slope radially outwardly away from the axis of their respective arbor bolts at a relatively small angle on the order of 10°.

8. In an agricultural implement, a foldable disk gang assembly comprising an inner main gang section having a fixed support bar, and an outer wing gang section having a movable support bar, each gang section including an arbor bolt rotatably carried by its respective support bar, a plurality of axially spaced ground-working disks fixedly mounted on the arbor bolt for rotation in unison therewith, spacer spools interposed between adjacent disks, and an arbor nut on one end of the arbor bolt and serving to clamp the disks and spacer spools together, hinge means pivotally connecting the inner end of the movable support bar to the outer end of the fixed support bar for swinging movement in an arc between an operative extended position wherein the support bars, as well as the arbor bolts, are in axial alignment and an inoperative retracted position wherein the movable support bar overlies the fixed support bar in reentrant fashion, and coupling means effective when said movable support bar is in its extended position constraining said arbor bolts, and consequently the disks carried thereby to rotate in unison while allowing for an appreciable degree of circumferential lost motion, said coupling means comprising a pair of coupling members fixedly secured to the adjacent ends of said arbor bolts, each coupling member being in the form of a casting having a hub portion telescopically received over an end of its associated arbor bolt and secured in position thereon by the adjacent arbor nut, and an eccentrically disposed torque-transmitting finger projecting longitudinally outwardly from said hub portion, said fingers overlapping each other in the longitudinal direction of the disk gang assembly when said movable support bar is in its extended position and being capable of side-by-side engagement with each other to limit relative rotational movement of the arbor bolts in either direction to a major circle sector on the order of slightly less than 360°.

* * * * *